May 28, 1929.  R. S. BURDETTE  1,714,999
METHOD OF MANUFACTURING AND CORE FOR HOLLOW RUBBER ARTICLES
Filed June 9, 1923    4 Sheets-Sheet 1

INVENTOR
RICHARD S. BURDETTE
BY
ATTORNEY

May 28, 1929.  R. S. BURDETTE  1,714,999
METHOD OF MANUFACTURING AND CORE FOR HOLLOW RUBBER ARTICLES
Filed June 9, 1923  4 Sheets-Sheet 2

INVENTOR
RICHARD S. BURDETTE
BY
ATTORNEY

May 28, 1929.  R. S. BURDETTE  1,714,999
METHOD OF MANUFACTURING AND CORE FOR HOLLOW RUBBER ARTICLES
Filed June 9, 1923    4 Sheets-Sheet 3

INVENTOR
RICHARD S. BURDETTE
BY
ATTORNEY

May 28, 1929.  R. S. BURDETTE  1,714,999
METHOD OF MANUFACTURING AND CORE FOR HOLLOW RUBBER ARTICLES
Filed June 9, 1923    4 Sheets-Sheet 4
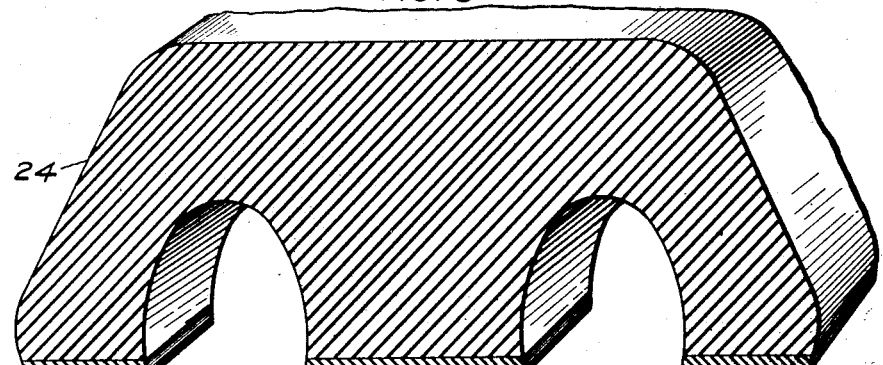
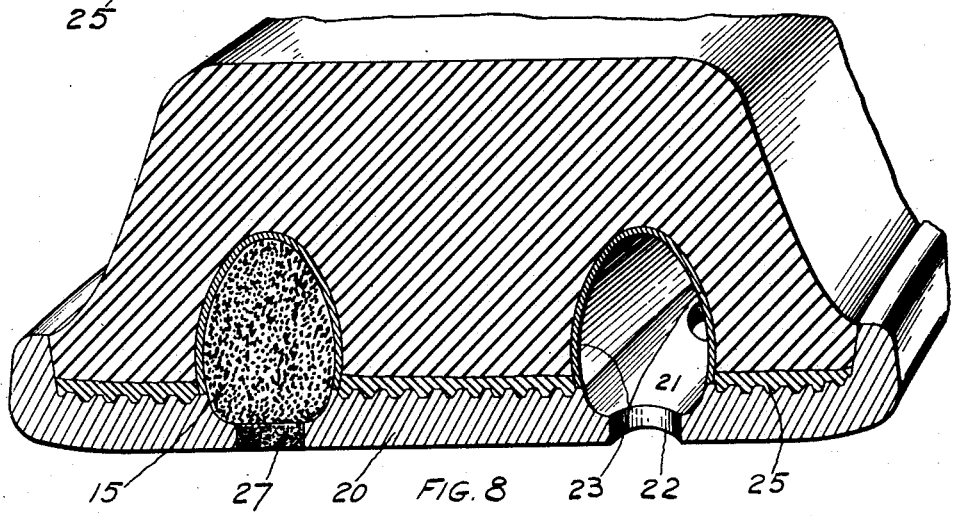
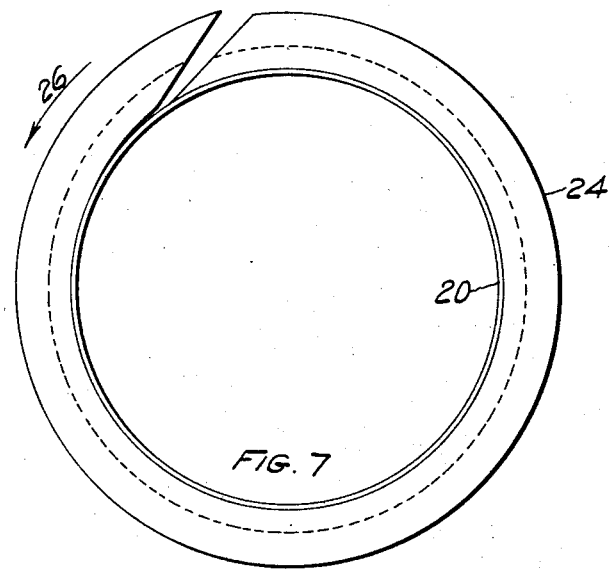
INVENTOR
RICHARD S. BURDETTE
BY
ATTORNEY Patented May 28, 1929.

1,714,999

UNITED STATES PATENT OFFICE.

RICHARD S. BURDETTE, OF AKRON, OHIO, ASSIGNOR TO THE GOODYEAR TIRE & RUBBER COMPANY, OF AKRON, OHIO, A CORPORATION OF OHIO.

METHOD OF MANUFACTURING AND CORE FOR HOLLOW RUBBER ARTICLES.

Application filed June 9, 1923. Serial No. 644,477.

My invention relates to the manufacture of rubber articles and it particularly contemplates an improved core for use in the molding of rubber goods. The object of my invention is to provide a core that shall be very strong and durable during the molding operations and that shall be readily removable from the molded articles after the article is completely cured.

Fusible and soluble cores of various types and kinds have heretofore been proposed, but none of these, so far as I am aware, have met with the severe requirements imposed by molded rubber goods. It is very desirable that cores used for this purpose shall retain their rigidity during the entire molding operation, and yet be of such a nature that they can be completely and readily removed from the molded article after the cure is completed.

In accordance with my invention I provide a core of such composition that it will be very strong and durable during the molding operations, that will be inexpensive to make, that can be molded into any desired shape, and that can be quickly and completely dissolved out of the completed molded article. Various other objects and advantages of practicing my invention will be apparent from a perusal of the following specification.

I have found that a mixture of glucose sand and water in a great range of proportions that can readily be determined by experiment, produces a composition that becomes very strong and durable when it is dried and that quickly loses all cohesion when again dampened, even after it has been subjected to the heat treatments necessary for vulcanization. The glucose does not char or break down under ordinary vulcanizing temperatures. Furthermore, it forms a core that is far stronger than can be produced from any of the various salts and the like that have been previously used in the formation of cores for use in the molding of rubber goods and in allied industries. I do not believe that glucose as a binder for sand cores adapted to be used in the molding of rubber goods has even before been proposed.

Fig. 1 of the accompanying drawing is an elevational view of a machine adapted for use in molding cores constructed in accordance with my invention;

Fig. 6 is a transverse sectional view of the molded tread stock prior to mounting the same on the base band;

Fig. 7 is a side elevational view illustrating the application of tread stock to the base band; and Fig. 8 is a transverse sectional view of a finished tire constructed in accordance with my invention and having one core section removed.

I have found by trial that a mixture of about 40 parts of sand, one part of water, and two parts of glucose provides a material that is particularly well suited for use in the manufacture of cores for molded rubber articles. Although I have specified this particular proportion as being very suitable, the best proportion can readily be determined by experiment for each grade of sand or for different qualities of glucose. A very large variation from these proportions will operate with a very great degree of satisfaction, although they are not the best proportions that can be obtained.

One of the best methods of mixing these materials is to add the glucose to the sand and mix the two thoroughly to disperse the glucose throughout the mass. Just enough water is then added to dampen the mass and it is allowed to dry while being worked until a hand full of the mixture will cling together when pressure is released. Too much glucose is undesirable because it forms a sticky mass whereas, if the suggested proportions are used, the material is not sticky. The water and glucose of this mixture forms a binder that unites the sand into a strong and compact mass when allowed to dry.

The glucose is not appreciably changed by the heat treatment to which the rubber articles are subjected during vulcanization and it dissolves almost immediately upon the application of water after the cure is completed. This destroys the binder and the sand is readily removed from the article, collected and prepared for repeated use in the same process.

Figure 1:
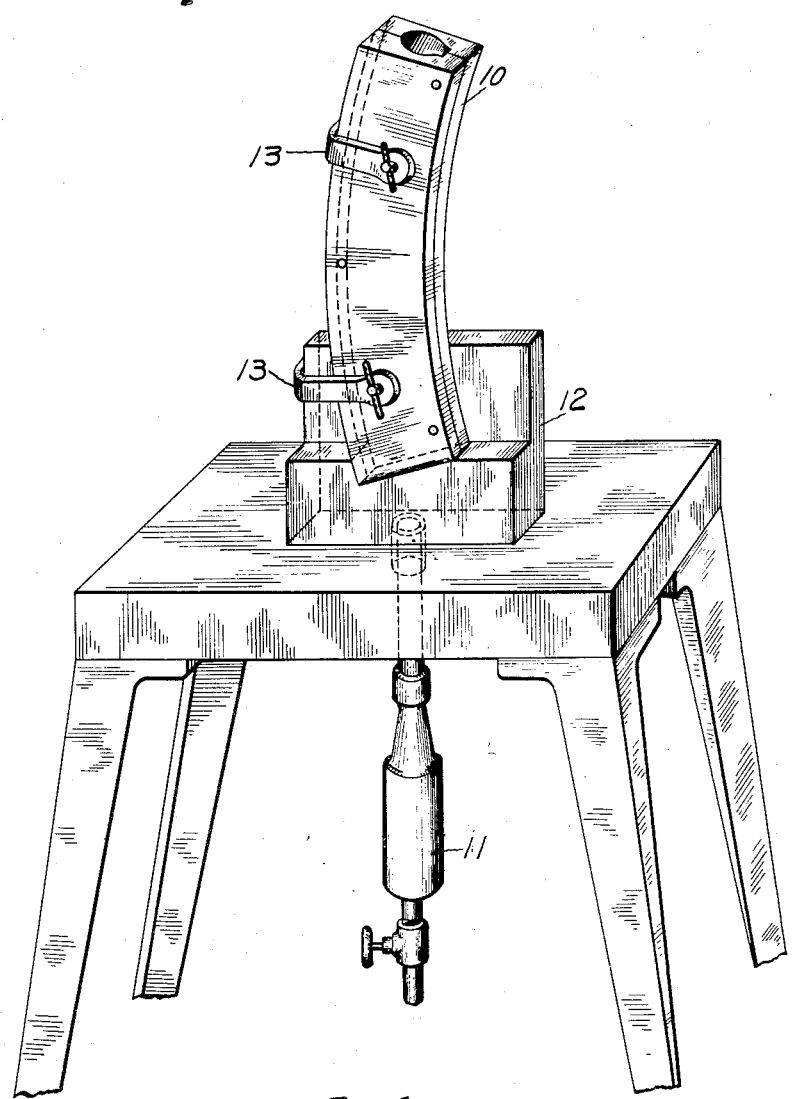

I have arranged a mold 10, as shown in Fig. 1, that is adapted to be jarred by means of an air hammer 11 that acts against a base member 12 upon which the mold is secured in substantially a vertical position by means of clamps 13. The sand and glucose mixture formed as previously described, is poured into the open end of the two part mold 10 and the air hammer is operated to jar it into position within the mold. A slight tamping by means of a suitable rod (not shown) insures proper filling and compacting of the material within the mold. This method of filling the mold insures an absence of voids and produces a much better surface and more uniform body than is otherwise obtainable.

Figure 2:
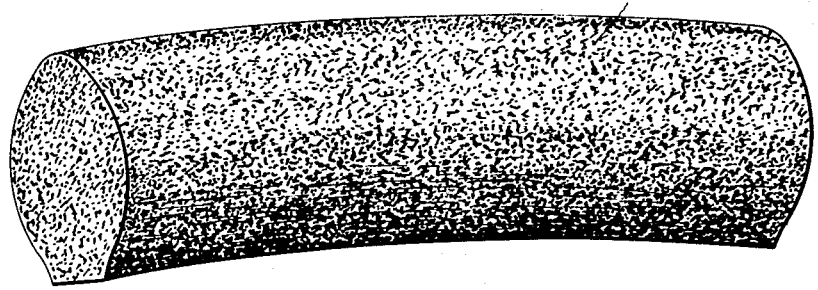
Fig. 2 is a view in perspective of a portion of a core constructed in accordance with my invention for use in the molding of a cushion tire.
Figure 3:
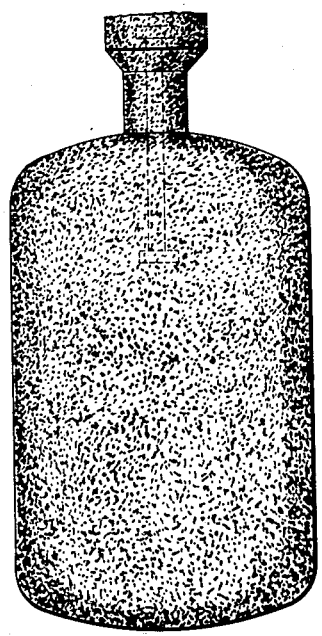
Fig. 3 is a plan view of a core that is adapted to have a water bottle molded thereon.

After the mold is filled with the compacted sand, the molded core 15 is removed therefrom and allowed to dry at room temperature for a sufficient time to harden it. The core is then ready for use in the molding of rubber goods. Although I have illustrated a typical core in Fig. 2 for use in the formation of chambers within a cushion tire, a core formed in this way could be shaped for many other articles, such as for a hot water bottle as shown in Fig. 3 and for many other uses.

A steel base band 20 of familiar construction has a peripheral channel 21 formed therein and a series of holes 22 of about one-half inch diameter formed in the channeled portion of the rim and suitably spaced around the periphery thereof.

Figure 4:
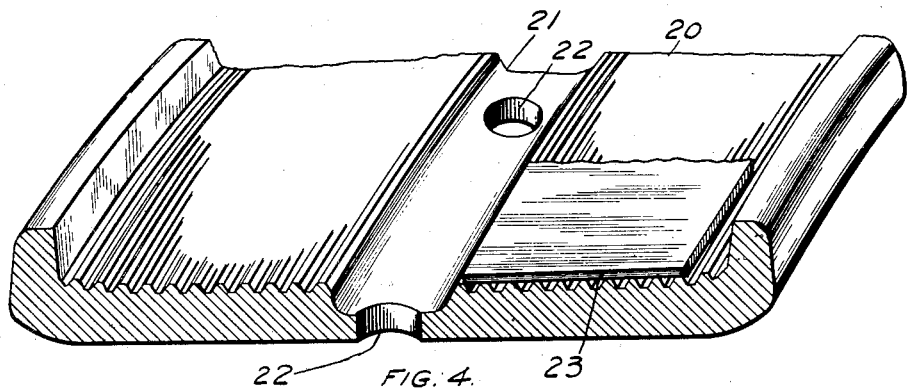
Fig. 4 is a transverse sectional view of a base band adapted to have a tire molded thereon in accordance with my invention.
Figure 5:
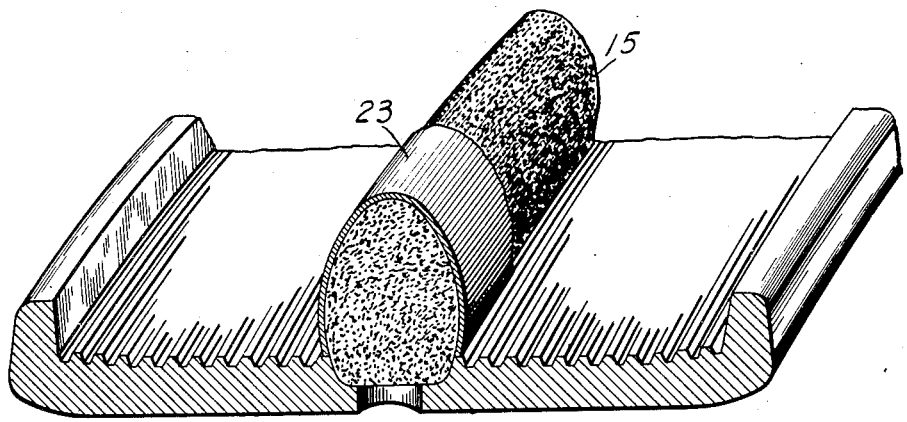
Fig. 5 is a transverse sectional view of a portion of a base band illustrating one step in the manufacture of a cushion tire, and particularly illustrating a method of holding a core section in place on the base band prior to placing the rubber tire body thereon.

The peripheral channel 21 is of the proper width to receive core sections 15. An endless band of cured rubber 23 is first stretched over the base band in the position shown in Fig. 4, and a portion 15 of the sand core is placed within the channel 21 and the rubber band 23 is lifted over the core as shown in Fig. 5 to retain the same in place. Additional sections of sand core are placed in abutting relation in the channel under the rubber band to complete the core for the tire. Fig. 5 illustrates the arrangement of parts in this step of the manufacture of the tire for any transverse section of the rim.

A layer 25 of hard rubber stock is applied to each side of the stock in order to insure proper union between the tread rubber and the steel base band. The tread stock 24 that is used with the conventional form of cushion tire is passed through a tube machine to impart the cross-sectional form shown in Fig. 6 and a definite length of tubed stock is wound onto the rim base, the ends of the tread rubber being spliced as shown in Fig. 7. After tne splice is completed, the tire is spun in the direction of the arrow 26 and the tread rubber is stitched into place to insure a proper union with the layer of hard rubber stock and with the steel base band.

The holes 22 that are formed in the steel base band are filled with plaster of Paris 27 to prevent seepage of water or steam from the vulcanizing chamber into the sand core, and the tire is then vulcanized under pressure in a mold in accordance with customary practice.

After the desired cure is effected, the plaster of Paris is broken out of the various holes in the rim, and a stream of water is turned into these holes. The binder that secures the sand into the solid core formation, immediately dissolves when the water comes in contact with it, and the loose sand is washed from the inside of the tire through the holes 22 in the base band. The capillary attraction of the compacted sand causes dampness to travel very rapidly through the core when water is applied to the holes in the rim. After the loose sand is removed from the cavity the article is completed. Fig. 8 particularly illustrates a tire having two peripheral cavities from one of which the core is removed and in the other of which the sand core and plaster of Paris remains.

Although I have illustrated and described my invention as applied to the molding of a cushion tire, it is obvious that the invention can be extended to the molding of any article of either rubber or of other plastic or moldable material having a chamber formed therein. Although a very smooth surface can be obtained by the use of fine sand, it may at times be desirable to spray or paint the outer surface of the core with a soapstone-glucose solution to obtain a smoother surface. Other articles that could conveniently be manufactured by practicing this invention are such things as rubber balls, rubber sundries of various kinds, hot water bottles and in fact any molded article from which the core can be removed in a dissolved condition after the article is molded.

Cores of this type are also usable in the manufacture of articles from moldable materials other than rubber compositions. There are various compounds and compositions that can be effectively molded on a core of this type and my invention should not be limited to the specific use of rubber.

In order to use the core that I propose with such moldable materials as plaster of Paris, cement, condensation products or other materials wherein water is used or developed in the molding operation, it is first desirable to provide a skin or waterproof integument over the molded core 15 that will protect the core from moisture during the molding operation and that can be broken through at one or two places to permit washing the sand from the completed molded article. A waterproofing paint or a coating of gelatine or other substances could be used. Shellac would provide a sufficiently impervious coating for ordinary purposes but it might be necessary or desirable to cover the core with a layer of metal from a conventional metal spray to form an artistic inside layer of metal for the article being molded.. It would be a simple matter to penetrate this layer after the article was completed, to dissolve out the core or to cut away the excess surfacing material after the article is completed.

I desire that only such limitations shall be imposed as are indicated in the accompanying claims.

What I claim is:

1. A core for use in molding rubber articles comprising a granular material and a binder of glucose.

2. A core for use in molding rubber articles comprising sand and glucose.

3. A core for use in molding rubber articles, comprising an insoluble and impermeable granular material, and a binder containing glucose.

4. A core for use in molding rubber articles comprising a body matrix of granular material united by a glucose binder, and a smooth surfacing material.

5. A core for use in molding rubber articles comprising a matrix of substantially 80 parts by weight of sand and a binder comprising 4 parts, by weight, of glucose with sufficient water to perceptibly dampen the sand.

6. The method of forming a core for use in molding rubber articles which consists in mixing substantially four parts of glucose by weight with 80 parts of sand, adding sufficient water to moisten the mixture, compressing the material within a mold, and drying the material at room temperature.

7. A core for use in molding articles comprising sand united by a glucose binder and a waterproofing surfacing material.

8. A core for use in molding articles comprising a disintegratable body coated with an insoluble skin.

9. A core for use in molding articles comprising a body of insoluble granular material united by a soluble binder and an insoluble surfacing material.

10. A core for use in molding articles comprising sand united by glucose and completely encased in a relatively thin waterproof skin.

11. A core for use in molding rubber articles comprising sand united by a glucose binder, and a rubber covering applied thereto and adapted to hold the core parts in proper molding relation.

12. A method of forming a hollow molded article that consists in forming separate parts of a core by hardening a mixture of sand and glucose, binding the parts of the core in cooperating relation by means of an elastic covering, embedding the core in the material from which the article is to be molded, molding the article around the core under heat and pressure, and subsequently removing the core by disintegration.

13. The method of constructing a cushion tire which comprises mounting a disintegratable core upon the outer periphery of a metal base band, vulcanizing a rubber cushion body on said base band to completely encase said core, and removing said core by disintegration.

14. The method of constructing a cushion tire which comprises mounting a core on the external periphery of a metal base band in direct contact with the surface of said base band, vulcanizing a rubber cushion body on said base band, completely encasing said core, and removing said core by disintegration.

15. The method of constructing a cushion tire which comprises mounting a core of disintegratable material on the external periphery of a metal base band in direct contact with the surface of said band, vulcanizing a rubber cushion body on said band completely encasing said core, and disintegrating and removing said core through relatively small perforations in said base band.

16. The method of constructing a cushion tire which comprises mounting a core of dried sand and glucose directly in contact with the outer surface of a metal base band having a series of perforations therethrough that are sealed with plaster of Paris, vulcanizing a rubber cushion body on said band completely encasing said core, and subsequently removing the core through said perforations after disintegration with water.

17. The method of constructing a cushion tire which comprises assembling a sectional disintegratable core upon a base band, retaining the sections of said core in place by means of a rubber band, building a rubber cushion body on said base band over said core, and vulcanizing said assembled structure.

18. The method of constructing a cushion tire which comprises holding a plurality of core sections in place on a base band by means of a band of cured rubber, building a cushion body over said core sections, vulcanizing the assembled structure and removing the core sections.

19. The method of constructing a cushion tire which comprises holding a plurality of core sections in place on a metal base band by means of a band of substantially cured rubber, building a cushion body over said core sections, and vulcanizing said cushion body to said band.

20. That method of manufacturing solid tires of the cushion type which consists in, vulcanizing rubber composition to a one-piece metallic rim with enclosed comminuted material defining an internal cavity formation, and finally removing the material in comminuted form from the vulcanized tire on the rim.

21. That method of manufacturing a cushion type of solid tire consisting of vulcanizable rubber composition and having an internal cavity formation which consists in, mounting on a metallic rim a core of comminuted material substantially resistant to flow or displacement, assembling vulcanizable rubber composition thereabout, vulcanizing the assemblage while externally confined, and finally removing the material in comminuted form from the vulcanized assemblage of tire and rim.

22. That method of manufacturing a cushion type of solid tire consisting of vulcanizable rubber composition and having an internal cavity formation which consists in, assembling vulcanizable rubber composition on a one-piece metallic rim with comminuted material defining a desired internal cavity formation for enhancing the cushioning properties of the completed article, vulcanizing the assemblage while externally confined, and finally removing the material in comminuted form substantially completely from the vulcanized assemblage of tire and rim.

23. That method of manufacturing cushion tires which consists in, amassing vulcanizable rubber composition on a metallic rim and about a core of comminuted material confined to approximate the cushioning cavity formation desired in the product, vulcanizing the composition to the rim while externally confined, and subsequently extracting the material in comminuted form through the rim to which the rubber composition has been vulcanized.

24. In a process of making rubber tires having an internal core cavity and wherein the rubber body of the tire is vulcanized in a compression mold to a metallic base band, the forming of the core for the said cavity consisting of substantially inflexible and brittle sectors of a ring; the assembling around the outer periphery of the said base band of said brittle sectors into an encircling ring radially supported thereby; and flexibly securing said sectors together and to the base band to permit the said base band to be circumferentially flexed in the compression mold without fracturing the brittle sectors of the said core.

In witness whereof, I have hereunto signed my name.

RICHARD S. BURDETTE.